United States Patent [19]

Åsberg

[11] Patent Number: 4,948,542
[45] Date of Patent: Aug. 14, 1990

[54] METHOD AND DEVICE FOR MANUFACTURING FIBRE BOARD

[75] Inventor: Per A. Åsberg, Stockholm, Sweden
[73] Assignee: Sunds Defibrator Aktiebolag, Sweden
[21] Appl. No.: 339,619
[22] PCT Filed: Dec. 11, 1987
[86] PCT No.: PCT/SE87/00593
 § 371 Date: Apr. 5, 1989
 § 102(e) Date: Apr. 5, 1989
[87] PCT Pub. No.: WO88/04224
 PCT Pub. Date: Jun. 16, 1988

[30] Foreign Application Priority Data
Dec. 11, 1986 [SE] Sweden .............................. 8605330

[51] Int. Cl.⁵ .................. G01G 11/02; G01G 11/08
[52] U.S. Cl. .................... 264/40.4; 19/300; 177/119; 198/635; 222/57; 222/77; 425/83.1; 425/140; 425/145
[58] Field of Search ............... 198/504, 505, 573, 635; 19/300, 161.1; 425/80.1, 81.1, 82.1, 83.1, 140, 145, 148, 135, 141; 264/40.4, 40.1, 165; 8/443; 222/5, 5.57, 77; 177/119, 120, 121, 12; 131/280

[56] References Cited

U.S. PATENT DOCUMENTS

| | | | |
|---|---|---|---|
| 2,346,880 | 4/1944 | Urbain | 198/635 |
| 2,889,030 | 6/1959 | Mottet | 198/573 |
| 3,430,751 | 4/1969 | Bateson | 198/505 |
| 3,792,943 | 2/1974 | Helegesson | 425/83.1 |
| 4,133,455 | 1/1979 | Moser | 198/504 |
| 4,221,507 | 9/1980 | Olney | 198/505 |
| 4,506,413 | 3/1985 | Leifeld | 19/300 |
| 4,562,917 | 1/1986 | Suzuki et al. | 425/371 |
| 4,574,433 | 3/1986 | Brunnschweiler | 19/300 |
| 4,580,698 | 4/1986 | Ladt et al. | 198/505 |

OTHER PUBLICATIONS

"Automatic Batching and Loading-Out Control Systems" by Merrick, Scale Manufacture Company, New Jersey, 2/1967.
"The Feedsweight Model WL" by Merrick, Scale Manufacture Company, New Jersey, 6-1968.

Primary Examiner—Jay H. Woo
Assistant Examiner—Khanh P. Nguyen
Attorney, Agent, or Firm—Lerner, David, Littenberg, Krumholz & Mentlik

[57] ABSTRACT

The abstract related herein is a device for continuously weighing a web during formation thereof such that uniformity can be promoted in a continuous process. A method for forming fiber board is also disclosed.

11 Claims, 1 Drawing Sheet

METHOD AND DEVICE FOR MANUFACTURING FIBRE BOARD

FIELD OF THE INVENTION

The invention relates to the field of fiber board manufacture and specifically to devices for weighing fiber board, prior to completion of the board's construction.

BACKGROUND OF THE INVENTION

Fiber board is conventionally manufactured from a blend of fiber material and suitable binding agents which are processed through a forming device and placed, as a relatively thick web, onto a forming wire. The web is then heated and pressed in either a single or a plurality of steps until the desired final product is obtained. The quality of the fiber board depends upon a number of factors, none the least of which is the uniformity of fiber distribution in the non-woven web placed on the forming wire.

One conventional method of determining the uniformity of fiber distributions involves the weighing of the web prior to the final heating and pressing operations which result in a finished fiber board. However, because the weighing operation has been carried out at the end of the preliminary formation step, the board material must be removed from the forming wire, weighed, and then transported to a pressing operation. In the meantime, a substantial amount of non-uniform board has been produced, all of which must be discarded or recycled. Additional non-uniform fiber board results during the time between the detection of the non-uniformity and the accurate translation of this information into corrective action. Thus, the delays in adjustment of the distribution of fibers in the prefinished fiber board are caused, in substantial part, by the distance that the distribution determining device is located from the point at which fiber board is formed and the lack of an adequate feedback mechanism to efficiently deal with the problems of a continuous system.

Therefore, there remains a need for a device and a methodology which will eliminate these delays in adjusting the distribution of fibers in the web with their resulting formation of substantial amounts of non-uniform fiber board.

It is therefore an object of the present invention to provide a device for continuously weighing a web during formation thereof in such a way as to minimize the distance between the point at which the web is weighed and the point of formation thereof, thereby eliminating both weighing delays and the large quantities of non-uniform fiber board material resulting therefrom.

It is also an object of the present invention to provide a device for continuously weighing a web during the formation thereof which includes an effective system for rapidly correcting the non-uniformity of fiber board in a continuous manner.

Another object of the present invention is to provide a process for weighing fiber board, continuously, during its manufacture in such a way as to promote uniformity.

Another object of the present invention is to provide a process for the continuous weighing of webs during the manufacture of fiber board wherein fiber distribution information from a weighing device is rapidly transmitted to a forming device thus minimizing the delay in adjusting fiber distribution.

SUMMARY OF THE INVENTION

In accordance with one aspect of the present invention, a device is provided for continuously weighing a web during formation thereof. The device includes a wire means having an upper surface for continuously moving the web in a predetermined direction, a means for forming the web and depositing the web onto the upper surface of the wire means at an upstream location thereon, weighing means for weighing the web at a location downstream on the wire means, and lifting means for lifting the web off of the wire means and for delivering the web onto the weighing means, the means for lifting being located between said forming means and said weighing means whereby said web continuously moves across the weighing means and is weighed thereby and returned to the wire means.

According to another aspect of the present invention, a device is provided as described immediately above wherein the weighing means and the forming means are connected to a means for controlling the supply of fiber material.

According to yet another aspect of the invention, a device for continuously weighing a web during formation, as first described is provided which includes a means for controlling the thickness of a web, said thickness controlling means connected to both said weighing means and said forming means.

In yet another aspect of the present invention, a method of continuously weighing a web prior to complete formation is provided which includes the steps of supplying fiber material, depositing and uniformly distributing said fiber material on a running forming wire, forming a web of said fiber material, lifting the web from an upper surface of the running forming wire, and weighing the web before the web returns to intimate contact with the running forming wire.

BRIEF DESCRIPTION OF THE DRAWINGS

Preferred embodiments of the present invention will be described in greater detail with reference to the accompanying drawings, wherein like members bear like reference numerals and wherein.

DETAILED DESCRIPTION OF THE PREFERRED EMBODIMENTS

Figure 1:
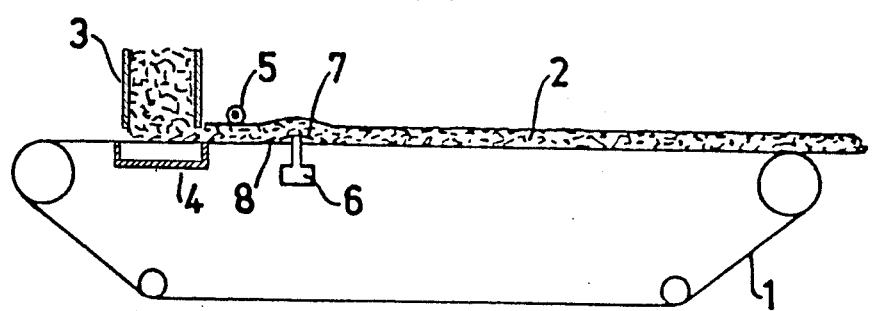
FIG. 1 is a diagramatic view of the apparatus of the present invention.

In the manufacture of fiber board in a continuous fashion, time is a critical element. The longer imperfections go undetected, the greater the amount of fiber board produced containing those imperfections. The present invention provides a unique manufacturing regiment and device which minimizes the distance between the formation of fiber board webs and determination of their uniformity. In addition, a device and methodology are provided for translating information relevant to the uniformity and thickness of the web being made to the web-forming machinery such that adjustments in both thickness and uniformity can be carried out dynamically. The device of the present invention involves the disposition of a weighing device along a forming wire upon which fiber board is formed such that the distance and time between formation and weighing is minimized.

Fiber board can be manufactured by dry-forming or wet-forming. In dry-forming, dry paper making pulp is fluffed to form fibers which are suspended in air. The airborne fibers, without the addition of water or solvent, are deposited on an air previous wire, usually followed by the addition of chemical binding agents which provides structural integrity for the fiber mass. Wet-forming involves the use of a fiber suspension, usually in water. The suspension is placed on a running wire or conveyor belt and generally de-watered or dried by the use of, for example, suction boxes.

Thus, the device of the present invention begins with the use of either a wet or dry-forming apparatus which is known from the art. The web material is formed and deposited thereby onto a running wire which is, in preferred embodiment, an air pervious wire. The forming device includes means for uniformly distributing the fiber material upon the wire and, in a preferred embodiment, means, such as a mill, for smoothing at least an upper surface of the web. A plurality of such smoothing means may be located along the entirety of the forming wire as desired.

As the web moves along the forming wire, it contacts means for lifting the web off of the wire which, in a preferred embodiment, is a conventional doctor blade. The blade is arranged such that it traverses the width of the forming wire and such that it opposes the motion of the web. The web is lifted by the doctor blade off of the wire and deposited upon a weighing means for weighing the web which is located downstream of both the forming device and the doctor blade in such a way that the web never returns to intimate contact with the forming wire between the time it is lifted by the doctor blade and deposited upon the weighing means. In fact, the distance between the forming device, the weighing device, and the lifting means should be maintained as short as possible. The weighing means comprises a scale plate which traverses the width of the forming wire in such a way that it is not acted upon by the forming wire. The weighing device further comprises a scale and a means for transmitting weight distribution information to the forming device. In a preferred embodiment the scale plate should have an extension in the direction of the web movement of between about 200 and about 500 mm. The surface of the scale plate shall be manufactured from a material having low friction so that the web easily can slide over the surface.

Figure 2:
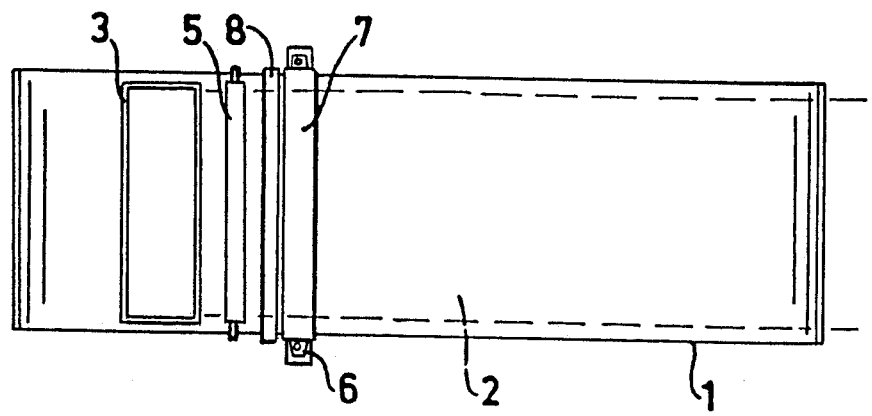
FIG. 2 is a plain top view of the apparatus of FIG. 1.

Both the device of the present invention and the process of forming an continually weighing fiber board are better understood with reference to the following description and with reference to FIGS. 1 and 2. It is understood that while the following description relates principally to fiber board formed by a dry-forming process a wet-forming process is well within the scope of the present invention.

Upon the upper surface of a continuously moving forming wire 1 have a predetermined direction, fiber material impregnated with binding agents is deposited such that a web 2 is formed. The material is deposited and distributed by the forming means for forming said web 2 and for depositing the web 2 unto the upper surface of the wire 1. The fiber materials dispersed in air, whereby the air is sucked off through the wire 1 through a suction box 4 located beneath the forming wire 1, while the fiber material is deposited thereon. As the web 2 moves along the forming wire 1 it is contacted by, for example, a mill 5 is located above web 2, the mill 5 disposed to smooth the upper surface of the web 2. In a most preferred embodiment, the forming means for forming the web 2 comprises both the distribution device 3 and the mill 5 controlling both the uniform distribution and the thickness of the web. Located downstream of the forming means for forming the web 2 and depositing the web onto the upper surface of the wire means 1 is a weighing device 6 which shall be kept as close to the forming means as practicable. The weighing device 6 comprises a scale plate 7 which is located adjacent the upper side of wire 1 and which extends across the wire 1. Located upstream of the scale plate and at the leading edge thereof, a separate doctor blade 8 is located for lifting the web off of the wire means and for delivering the web onto the weighing means. The doctor blade 8 is not connected to the scale plate 7 but, like the scale plate, is attached on both sides of the wire so as not to influence the weighing. The web 2 is lifted up by the doctor blade 8, slides over and onto the scale plate 7 and returns from there to the wire 1. In a particularly preferred embodiment the scale plate 7 has an extension in the direction of the web movement of between about 200 and about 500 mm. The scale plate 7 shall be made from a material of sufficiently low friction, or shall be coated with a low friction coating so that the web easily can slide over the surface of the scale plate 7 prior to returning to the forming wire 1. Scale plate 7 is suspended on both sides of wire 1 and is attached to a weighing device located beneath the forming wire 1.

The weight, which is continuously monitored by the weighing device, indicates deviations in the uniform distribution of fibers in the web. Thus, in a particularly advantageous embodiment of the present invention, the weighing device is placed in communication with either the forming device for depositing and uniformly distributing fiber material or the device for smoothing the upper surface of the web, or both, such that the distribution fibers may be continuously adjusted in accordance with the deviations detected.

It is also possible to use several forming means in which case the web is built up in steps. For the surface layers and central layers, different fiber materials can be used. For example, a first layer can contain 20% of the fiber amount, a second layer can contain 60% and a third layer another 20%. A weighing device according to the invention then can be used after each layer is applied such that each layer remains uniform. Finally, the web 2 is transformed from wire 1 to subsequent means for heating the web and pressing it into fiber board (not shown).

Principles, preferred embodiments, and modes of operation of the present invention have been described in the foregoing specification. The invention, which is intended to be protected herein, however, is not to be construed as limited to the particular embodiments disclosed, since these are to be egarded as illustrative rather than restrictive. Variations and changes may be made by others without departing from the spirit and scope of the invention.

I claim:

1. A device for continuously weighing a web during formation thereof comprising wire means having an upper surface for continuously moving said web in a predetermined direction, forming means for forming said web and depositing said web onto said upper surface of said wire means at an upstream location thereon, weighing means for weighing said web at a location downstream of said wire means, and lifting means for lifting said web off of said wire means and for delivering said web onto said weighing means, said lifting means being located between said forming means and said weighing means, whereby said web continuously moves across said weighing means to be weighed thereby and returned to said wire means.

2. The device of claim 1, wherein said forming means further comprises a forming device for depositing and uniformly distributing fiber material on said wire and for forming said fiber material into said web having substantially uniform properties.

3. The device of claim 2, wherein said web forming device is selected from the group of devices consisting of a wet forming device and a dry forming device.

4. The device of claim 1, wherein said weighing means for weighing said web comprises a scale plate and a scale, said scale plate being located above said upper surface of said wire means and extending from a first side of said wire means to a second side of said wire means, and positioned to receive said continuously moving web from said lifting means.

5. The device of claim 1, wherein said lifting means is a doctor blade.

6. The device of claim 4, wherein said scale plate has an extension in the direction of said web's movement of between about 200 and about 500 mm.

7. The device of claim 2, wherein said forming means further comprises at least one device for smoothing an upper surface of said web.

8. A method of continuously weighing a web during formation thereof comprising the steps of providing fiber material, depositing and uniformly distributing said fiber material on a running forming wire, forming a web of said fiber material, lifting said web from an upper surface of said running forming wire, and weighing said web before said web returns to intimate contact with said running forming wire.

9. The method of claim 8, further comprising the step of smoothing and pressing said web prior to lifting said web from the surface of said running forming wire.

10. The method of claim 9, further comprising the step of controlling the thickness of said web.

11. The method of claim 9, further comprising the step of controlling the supply of fiber material deposited and uniformly distributed onto said running forming wire in accordance with the weight determination.

* * * * *

UNITED STATES PATENT AND TRADEMARK OFFICE
CERTIFICATE OF CORRECTION

PATENT NO. : 4,948,542

DATED : August 14, 1990

INVENTOR(S) : Per A. Asberg

It is certified that error appears in the above-identified patent and that said Letters Patent is hereby corrected as shown below:

Column 3, line 2, "previous" should read --pervious--.
Column 4, line 6, "compries" should read --comprises--.
Column 4, line 45, "transformed" should read --transferred--.
Column 4, line 65, "of" should read "on".

Signed and Sealed this

Twenty-first Day of January, 1992

Attest:

HARRY F. MANBECK, JR.

*Attesting Officer*     *Commissioner of Patents and Trademarks*